US012336070B2

(12) United States Patent
Saes et al.

(10) Patent No.: US 12,336,070 B2
(45) Date of Patent: Jun. 17, 2025

(54) METHOD OF MULTI-CHANNEL CONTROL

(71) Applicant: eldoLAB Holding B.V., Son en Breugel (NL)

(72) Inventors: Marc Paul Saes, Son en Breugel (NL); Franciscus Bernardus Marie Van Horck, Son en Breugel (NL); Tijs Versteegde, Son en Breugel (NL)

(73) Assignee: eldoLAB Holding B.V., Son en Breugel (NL)

( * ) Notice: Subject to any disclaimer, the term of this patent is extended or adjusted under 35 U.S.C. 154(b) by 26 days.

(21) Appl. No.: 18/272,460

(22) PCT Filed: Jan. 26, 2022

(86) PCT No.: PCT/EP2022/051687
§ 371 (c)(1),
(2) Date: Jul. 14, 2023

(87) PCT Pub. No.: WO2022/161976
PCT Pub. Date: Aug. 4, 2022

(65) Prior Publication Data

US 2024/0147589 A1 May 2, 2024

(30) Foreign Application Priority Data

Jan. 26, 2021 (NL) ...................................... 2027385

(51) Int. Cl.
*H05B 45/38* (2020.01)
*H05B 45/24* (2020.01)
*H05B 45/375* (2020.01)

(52) U.S. Cl.
CPC ........... *H05B 45/375* (2020.01); *H05B 45/24* (2020.01); *H05B 45/38* (2020.01)

(58) Field of Classification Search
CPC ........ H05B 45/24; H05B 45/32; H05B 45/38; H05B 45/375; H05B 45/385; H05B 45/3725
See application file for complete search history.

(56) References Cited

U.S. PATENT DOCUMENTS 7,999,491 B2 * 8/2011 Peng ...................... H05B 45/22 315/307
8,390,205 B2 3/2013 Li et al.
(Continued)

FOREIGN PATENT DOCUMENTS

| | | | |
|---|---|---|---|
| EP | 3190862 | A1 | 7/2017 |
| WO | 2012063222 | A1 | 5/2012 |
| WO | 2019190317 | A1 | 10/2019 |

OTHER PUBLICATIONS

International Search Report and Written Opinion for International Application No. PCT/EP2022/051687, dated May 6, 2022, 14 pages.

(Continued)

*Primary Examiner* — Tung X Le
(74) *Attorney, Agent, or Firm* — Buchanan Ingersoll & Rooney PC

(57) ABSTRACT

A multi-channel LED driver for driving an LED fixture, wherein the multi-channel LED driver comprising a plurality of output channels, wherein each output channel is connectable to an LED or LED string of the LED fixture, the multi-channel LED driver comprising:

a plurality of power converters, each power converter being associated with an output channel of the plurality of output channels, wherein each power converter comprises a switch, and wherein each power converter converts an input power at an input terminal to a current at a respective output channel of the multi-channel LED driver, (Continued)

a comparator configured to compare a current signal representing the current measured at an output channel by a current measurement element with a reference signal representing a current set point for the output channel, and wherein the comparator generates an output signal to control the switch of the power converter associated with the output channel, a controller arranged to determine successive, for each of the plurality of power converters associated with the plurality of output channels, a duty cycle of the respective switch of the power converter during a measurement window and wherein the controller is further arranged to control the switch of the power converter outside the measurement window by:

disabling the comparator to control the switch and providing a duty cycle signal, representing the duty cycle of the switch as determined during the measurement window, to the switch of the power converter to control an operation of the switch.

14 Claims, 7 Drawing Sheets

(56) References Cited

U.S. PATENT DOCUMENTS

| | | | | |
|---|---|---|---|---|
| 8,941,320 | B2 * | 1/2015 | Choi | H05B 45/3725 323/280 |
| 9,774,396 | B2 * | 9/2017 | Raj | H05B 45/20 |
| 10,306,717 | B1 * | 5/2019 | Yau | H02M 1/34 |
| 2006/0001381 | A1 * | 1/2006 | Robinson | H05B 45/3725 315/291 |
| 2009/0224695 | A1 * | 9/2009 | Van Erp | H05B 45/3725 315/291 |
| 2011/0285301 | A1 * | 11/2011 | Kuang | H05B 45/10 315/200 R |
| 2012/0293078 | A1 * | 11/2012 | Logiudice | H05B 45/22 315/153 |

OTHER PUBLICATIONS

Netherlands Search Report for Netherlands Application No. NL2027385, dated Sep. 21, 2021, 15 pages.

* cited by examiner

METHOD OF MULTI-CHANNEL CONTROL

CROSS-REFERENCE TO RELATED APPLICATIONS

This application is a 371 filing of International Application No. PCT/EP2022/051687, filed Jan. 26, 2022, which claims priority to Netherlands Application No. NL 2027385, filed Jan. 26, 2021. The disclosures of these applications are incorporated herein by reference in their entireties for all purposes.

BACKGROUND

The technical field of the present invention relates to illumination systems using Light Emitting Diodes (LEDs).

The present invention relates to LED based lighting applications. Typically, such a lighting application comprises a power source or at least one power converter that is configured to supply a current to an LED fixture comprising one or more LEDs or LED strings. In known applications, LEDs producing light of different colors are often combined. The currents through the different LED groups are controlled by a multi-channel LED driver and supplied via multiple output channels, wherein the amplitude of the current at each output channel is controlled to create a constant current output. To realize a controllable, stable current, the switch of the respective power converter may be controlled by a controller. The system typically consists of a feedback loop between the controller and the LED fixture to regulate the output current of each output channel of the multi-channel LED driver.

The feedback process e.g. uses multiple comparators, wherein each comparator is connected to a corresponding LED string of the LED fixture and wherein each comparator compares the output current through the respective LED string with a desired current value.

At present, the feedback process and multiple comparators lead to a complex and bulky regulation system. Further, it can be mentioned that the usage of multiple comparators is inefficient and costly to generate a desired color characteristic.

SUMMARY OF THE INVENTION

It would be desirable to provide in LED based lighting application having an improved efficiency and cost efficient regulation of an LED fixture. Therefore, it is an object of the invention to provide a multi-channel LED driver that is more cost efficient and/or has an improved efficiency.

In order to realize this, according to an aspect of the invention, a multi-channel LED driver for driving an LED fixture is provided, wherein the multi-channel LED driver comprising a plurality of output channels, wherein each output channel is connectable to an LED or LED string of the LED fixture, the multi-channel LED driver comprising:

- a plurality of power converters, each power converter being associated with an output channel of the plurality of output channels, wherein each power converter comprises a switch, and wherein each power converter converts an input power at an input terminal to a current at a respective output channel of the multi-channel LED driver,
- a comparator configured to compare a current signal representing the current measured at an output channel by a current measurement element with a reference signal representing a current set point for the output channel, and wherein the comparator generates an output signal to control the switch of the power converter associated with the output channel,
- a controller arranged to:
  - receive an illumination set point representing a desired illumination to be generated by the LED fixture;
  - determine current set points, based on the illumination set point, for the plurality of output channels of the multi-channel LED driver;
  - and wherein the controller is further arranged to determine successive, for each of the plurality of power converters associated with the plurality of output channels, a duty cycle of the respective switch of the power converter by:
    - providing the reference signal, representing the current set point of the output channel associated with the power converter, to the comparator;
    - enabling the comparator at a beginning of a measurement window, which measurement window is a part of a cycle time, to compare the current signal of the output channel with the reference signal and generate an output signal to control the switch of the power converter;
    - controlling the switch of the power converter using the output signal;
    - determining a duty cycle of the switch of the power converter during the measurement window based on the output signal of the comparator;

wherein the measurement windows of the different switches are not overlapping in time;

- and wherein the controller is further arranged to:
  - control the switch of the power converter outside the measurement window by:
    - disabling the comparator to control the switch and
    - providing a duty cycle signal, representing the duty cycle of the switch as determined during the measurement window, to the switch of the power converter to control an operation of the switch.

In order to provide a supply current to an LED fixture, which comprises a plurality of LEDs or LED strings or LED groups, a multi-channel LED driver may be applied, which multi-channel LED driver comprises a controller and a plurality of power converters. In general, a power converter of the multi-channel LED driver according to the invention is powered at an input terminal by a power supply, e.g. a DC power supply derived from a mains supply by means of an AC/DC converter. Such an AC (alternating current)/DC (direct current) converter can be arranged to convert an alternating current source (or more general, a power source) to a substantially DC power source (or more general, a power source). AC/DC converters are widely applied to convert an AC power source such as a mains connection (e.g. 230 V, 50 Hz) to a DC power source. The output of said DC power source may then be applied to power a load or may be applied to power a further power source such as a power converter of a multi-channel LED driver. According to the invention, the power converter converts an input power received at an input terminal to a plurality of desired currents respective output channels of the multi-channel LED driver.

Each LED or LED string of the LED fixture can be powered by a power converter of the multi-channel LED driver, which power converter can be a switched mode power supply (SMPS). Such a switched mode power source may e.g. comprise an inductance, an unidirectional element such as a diode and a switching element or switch, e.g. a FET or a MOSFET. The switching of the switch can e.g. be controlled by a controller or control unit. It is further acknowledged that other types of power converters such as boost, buck-boost, CUK, SEPIC or other, either synchronous or non-synchronous may advantageously be applied in combination with the present invention.

The controller of the multi-channel LED driver according to the invention receives an illumination set point representing a desired illumination, e.g. a desired color and/or intensity, to be generated by the LED fixture. The illumination set point as received may e.g. be a mathematical description of the desired color and the desired intensity in a color space (e.g. the CEI Yxy color space, wherein xy are the chromaticity coordinates of the desired color and Y represents the overall intensity). The color space is a specific organization of colors, for example the CIE 1931 color space, which can be visualised in a chromaticity diagram.

The controller may comprise any type of controller, including e.g. analogue control electronics, digital control electronics, such as a micro controller, microprocessor, or any other suitable control device such as a Field Programmable Gate Array (FPGA), a programmable logic device (PLD), discrete logic electronics etc.

Based on the illumination set point, the controller determines current set points for the different output channels of the multi-channel LED driver. A current set point represents the particular current associated with a respective output channel, to generate the desired illumination by the LED fixture.

The controller is further arranged to determine successive for each of the plurality of power converters, a duty cycle of the switch of the power converter. The duty cycle is the fraction of one time period in which a signal or system is active. The duty cycle is commonly expressed as a percentage or a ratio. Due to the switching operation of the switch of the power converter, the instantaneous output current of the power converter will not exactly correspond to a desired current, but will have a saw-tooth profile. This effect is caused by a time delay between the detection of the actual output current and the switching of the respective switch of the corresponding power converter. A deviation of the output current with respect to the desired current, e.g. determined by a comparator, can be used to trigger the switching operation of the respective switch.

The aim of the invention is to ensure that the currents as provided by each channel of the multi-channel LED driver substantially corresponds to the desired current. In order to realize this, the output currents in the different channels are measured in sequence. This measurement cycle is applied within a cycle time or modulation time window or within a plurality of cycle times. During said cycle time or modulation time window, the output currents of the different channels are both measured and kept substantially constant, corresponding to the desired currents. The cycle time may e.g. be 3.3 ms. To generate a constant current for a respective output channel during the cycle time, the output current of the output channel is measured during a predetermined measurement window. The predetermined measurement window may e.g. be a fraction of the cycle time, e.g. 0.1 ms. During the measurement window, the duty cycle of the switch of the power converter associated with the output channel is determined. During the determination of the duty cycle of the switch of the power converter by the controller, the switch is controlled by an output signal generated by a comparator of the multi-channel LED driver. The comparator is configured to compare a current signal representing the current of the output channel, e.g. obtained by a current measurement element, with a reference signal for the output channel. The reference signal represents the current set point of the output channel.

To determine for each of the plurality of power converters, the duty cycle of the respective switch of the power converter, the controller is configured to repeat the duty cycle measurement process for each channel. First, the controller provides a reference signal, e.g. a reference signal representing a desired current for a first channel of the LED driver, to the comparator. As mentioned above, the reference signal associated with the respective output channel is based on the illumination set point. By comparing the reference signal with the current signal, representing the current through the first channel, the comparator controls the respective switch of the power converter associated with the first channel, by generating an output signal during the measurement window. This control of the switch of the power converter associated with the first channel by the comparator can e.g. be enabled by the controller. As such, the controller can enable the comparator at a beginning of the measurement window to control the respective switch of the corresponding output channel. The process of determining the duty cycle can be repeated for the different channels. In accordance with the invention, the measurement windows during which the duty cycles of the different channels are determined are construed to be non-overlapping. They may e.g. be distributed over a cycle time or modulation time window. Alternatively, during each cycle time, the duty cycle of only one channel or of a subset of the channels is determined. The measurement window is a part or fraction of the cycle time, wherein the comparator compares the current signal of the respective output channel with the reference signal for that output channel. During the measurement window, the controller further determines the duty cycle of the switch of the power converter based on the output signal of the comparator.

Outside the measurement window of a particular cycle time, i.e. during the remaining part or fraction of the cycle time, the controller controls the switch of the power converter by disabling the comparator and by sending or providing a duty cycle signal, representing the duty cycle of the switch determined during the measurement window, to the switch of the corresponding power converter to control an operation of the switch.

In an embodiment, a parallel switch is arranged in parallel to the current measurement element, which current measurement element is shorted by the parallel switch during the period the comparator is disabled. The advantage is that outside the measurement windows, the current measurement element is inactive and therefore the power loss originating from the current measurement element is reduced.

In an embodiment, a comparator switch is arranged at an input of the comparator, wherein the comparator switch is configured to connect the current measurement element of a respective output channel of the multi-channel LED driver with the input of the comparator at the beginning of the corresponding measurement window. The comparator switch may e.g. be a timer switch which switches the current measurement element of the corresponding output channel on or off at a preset time or times, or after a preset interval, or cyclically.

In an embodiment, the controller is configured to perform the enabling step of the comparator periodically. The determination of the duty cycle by the controller of a particular switch of the corresponding power converter may be performed cyclically, with a time interval which is equal to the cycle time or modulation time window or a multiple thereof.

In an embodiment, after the duty cycle has been determined in the respective modulation time window, the determination of the duty cycle is repeated when a new illumination set point is generated. A new illumination set point may occur when e.g. the intensity of the light is to be adjusted, e.g. reduced (i.e. dimming of the light).

In an embodiment, the illumination set point is generated by a user interface. The user interface may e.g. be a remote control to prompt the illumination set point, representing the desired color and/or intensity to be generated by the LED fixture.

In an embodiment, the comparator is configured to provide the output signal directly to the respective switch of the corresponding power converter during the measurement window. The output signal of the comparator may be sent or provided both to the controller and to the respective switch. The controller uses the output signal of the comparator to determine the duty cycle of the respective switch, while the comparator directly controls the respective switch during the measurement window by the output signal.

In an embodiment, the current measurement element may e.g. be a resistor. The current through the resistor with a known resistance value generates a voltage, which is provided at the input of the comparator. In an embodiment, when no current is flowing through the respective output channel, e.g. during the start-up phase, and the reference signal represents a non-zero current value, the comparator generates an output signal. The output signal ensures that the respective switch of the corresponding power converter is closed, wherein the current provided to the respective output channel will increase until the desired current value is reached. From the moment, the current through the resistor is equal to the desired current value, the output signal from the comparator ensures that the respective switch is switched to an open position.

In an embodiment, the multi-channel LED driver according to the invention comprises two output channels, wherein each output channel is connectable to a corresponding LED string of the LED fixture. The LED fixture comprises for example a LED string including one blue LED and a LED string including one red LED. The multi-channel LED driver further comprises two power converters, wherein each power converter converts an input power at an input terminal to a current at a respective output channel of the multi-channel LED driver. The controller of the multi-channel receives an illumination set point, which illumination set point may e.g. be color which is composed of 75% of red light and 25% of blue light with an emitted light intensity by the LED fixture of 100% of the maximal light intensity (i.e. the intensity reached when a maximal current is provided to all the LEDs). The maximal current need not be the same as the nominal current. Typically, the nominal current is the current which can continuously flow through an LED and which causes the LED to operate at a desired operating temperature or within a certain temperature range, so as to ensure a certain desired lifetime of the LED, e.g. expressed in illumination hours.

After receiving the illumination set point, the controller determines the current set points for the two output channels of the multi-channel LED driver. To provide the current to the respective LED string by the corresponding power converter, the controller first sends a reference signal, representing the current set point of the respective output channel, to the comparator. The comparator generates an output signal to control the respective switch of the corresponding power converter. The respective power converter provides a current to the corresponding LED string, e.g. the first power converter provides 0.7 A to the red LED and the second power converter provides 0.5 A to the blue LED. The respective switch of the corresponding power converter is controlled by the output signal of the comparator in such a way that the respective switch is closed when the current drops below the current set point and is opened when the current exceeds the current set point. Depending on the type of converter that is used, the opening and closing operations may be reversed. The ratio of the time window that the switch is open over the measurement window, represents the duty cycle of the respective switch. The duty cycle of the respective switch of the corresponding power converter is determined during the measurement window based on the output signal of the comparator. In an embodiment, the currents of the different output channels are controlled in such manner that during each cycle time only one channel is configured to supply a non-zero current. In such example, the determination step of the duty cycles of the first output channel and the second output channel are not performed in the same cycle time. In case only one channel is configured to supply a non-zero current at each instant in time, the currents provided by the different output channels may be measured by a common current measurement element. The advantage is that the regulation will be enhanced, since an error of the current measurement element will be the same for each output channel. If for each output channel a different current measurement element is used, the measurement process may be less accurate.

According to yet another aspect of the present invention, there is provided a method of driving a LED fixture by a multi-channel LED driver comprising a plurality of output channels and a plurality of power converters, each power converter being associated with an output channel of the plurality of output channels, wherein each power converter comprises a switch, and wherein each output channel of the respective power converter is connectable to an LED or LED string of the LED fixture, the method comprising:

- receiving an illumination set point representing a desired illumination to be generated by the LED fixture;
- determining current set points, based on the illumination set point, for the plurality of output channels of the multi-channel LED driver;
- determining successive, for each of the plurality of power converters associated with the plurality of output channels, a duty cycle of the respective switch of the power converter by:
  - providing a reference signal, representing the current set point of the output channel, to a comparator;
  - enabling the comparator at a beginning of a measurement window for the respective switch of the output channel, which measurement window is a part of a cycle time;
  - comparing, by the comparator, a current signal representing the current measured at the output channel by a current measurement element with the reference signal of the output channel,
  - generating, by the comparator, an output signal to control the respective switch of the corresponding power converter;
  - controlling the respective switch of the power converter using the output signal of the comparator;
  - determining a duty cycle of the respective switch of the power converter
  - during the measurement window based on the output signal of the comparator, wherein the measurement windows of the different switches are not overlapping in time; and wherein the method further comprises:

controlling the switch of the power converter outside the measurement window by disabling the comparator to control the switch and providing a duty cycle signal, representing the duty cycle of the switch determined during the measurement window, to the switch of the corresponding power converter to control an operation of the switch.

The method according to the invention comprises the step of receiving an illumination set point, representing a desired color and/or intensity for the light to be generated by a LED fixture. The LED fixture may e.g. comprise a plurality of LEDs or LED strings or LED groups. The LED fixture is driven by a multi-channel LED driver comprising a plurality of output channels and a plurality of power converters, wherein each power converter comprises a switch, and wherein each output channel of the respective power converter is connectable to an LED, LED string or LED group of the LED fixture. Based on the illumination set point, current set points are determined for the different output channels of the multi-channel LED driver. In the following step, a duty cycle of the respective switch of the power converter is determined successively for each of the plurality of output channels. This determination step is performed in substeps.

First a reference signal, representing the current set point of the respective output channel, is sent to a comparator. The comparator compares a current signal representing the current measured through a respective LED string by a current measurement element with the reference signal of the corresponding output channel, and wherein the comparator generates an output signal to control the respective switch of the corresponding power converter. Second, the comparator is enabled at a beginning of a measurement window for the respective switch of the corresponding output channel.

Thirdly, the respective switch of the corresponding power converter is controlled using the output signal of the comparator.

Finally, a duty cycle of the respective switch of the corresponding power converter is determined during the measurement window based on the output signal of the comparator, wherein the measurement windows of the different switches are not overlapping in time. When the duty cycle of the respective switch of the corresponding power converter is determined, the method according to the invention further comprises the controlling of the respective switch of the corresponding power converter outside the measurement window by disabling the comparator to control the respective switch and by sending a duty cycle signal, representing the duty cycle of the respective switch determined during the measurement window, to the respective switch of the corresponding power converter to control an operation of the switch.

In an embodiment, only one power converter provides a non-zero current per cycle time. Hence, during each cycle time or modulation time window, the duty cycle of only one switch of the corresponding power converter can be determined. Therefore, only one, common current measurement element is needed to determine the duty cycle of the respective switch.

In an embodiment, the measurement window is shorter than the cycle time, wherein the cycle time may e.g. set at 3.3 ms and the measurement window may e.g. be 0.1 ms. In a preferred embodiment, the measurement window starts at the beginning of the cycle time. In a further embodiment, the measurement window for each respective switch occurs periodically and thus the enabling step of the comparator is performed periodically or at predetermined instants.

In an embodiment, the current measurement element is shorted by a parallel switch, arranged in parallel to the current measurement element, during the period the comparator is disabled.

In an embodiment of the present invention, the determination of the duty cycles of the switches of the plurality of power convers is realized by means of a single comparator. In such embodiment, the multi-channel LED driver according to the invention only needs to be equipped with one comparator for the purpose of determining the occurring duty cycles. In such embodiment, the comparator is thus sequentially used to compare reference signals and current signals of the different power converters, associated with the different output channels. This sequence is performed during non-overlapping measurement windows.

BRIEF DESCRIPTION OF THE FIGURES

Further advantages, embodiments and features of the invention will become clear from the appended figures and corresponding description, showing non-limiting embodiments in which:

FIG. 1 depicts a first embodiment of the multi-channel LED driver according to the invention for driving an LED fixture. The arrangement as schematically shown comprises a first component 100, i.e. the multi-channel LED driver according to the invention and a second component 101, i.e. the LED fixture. In general, the LED fixture 101 may comprise a plurality of LEDs, LED strings or LED groups arranged in a variety of topologies. In accordance with the present invention, the multi-channel LED driver 100 comprises a plurality of power converters 100.1, a plurality of output channels 100.4, wherein each output channel is connectable to an LED, LED string or LED group of the LED fixture 101, a controller or control unit 100.2 and a comparator 100.3. Each power converter 100.1 comprises a switch (not shown in FIG. 1), and wherein each power converter 100.1 converts an input power ($P_{in}$) at an input terminal to a current at a respective output channel 100.4 of the multi-channel LED driver 100. In accordance with the present invention, various switched mode power converters may be applied such as Buck, Boost, Buck-Boost or hysteretic converters, as examples of the power converters 100.1 of the multi-channel LED driver 100.

Figure 1:
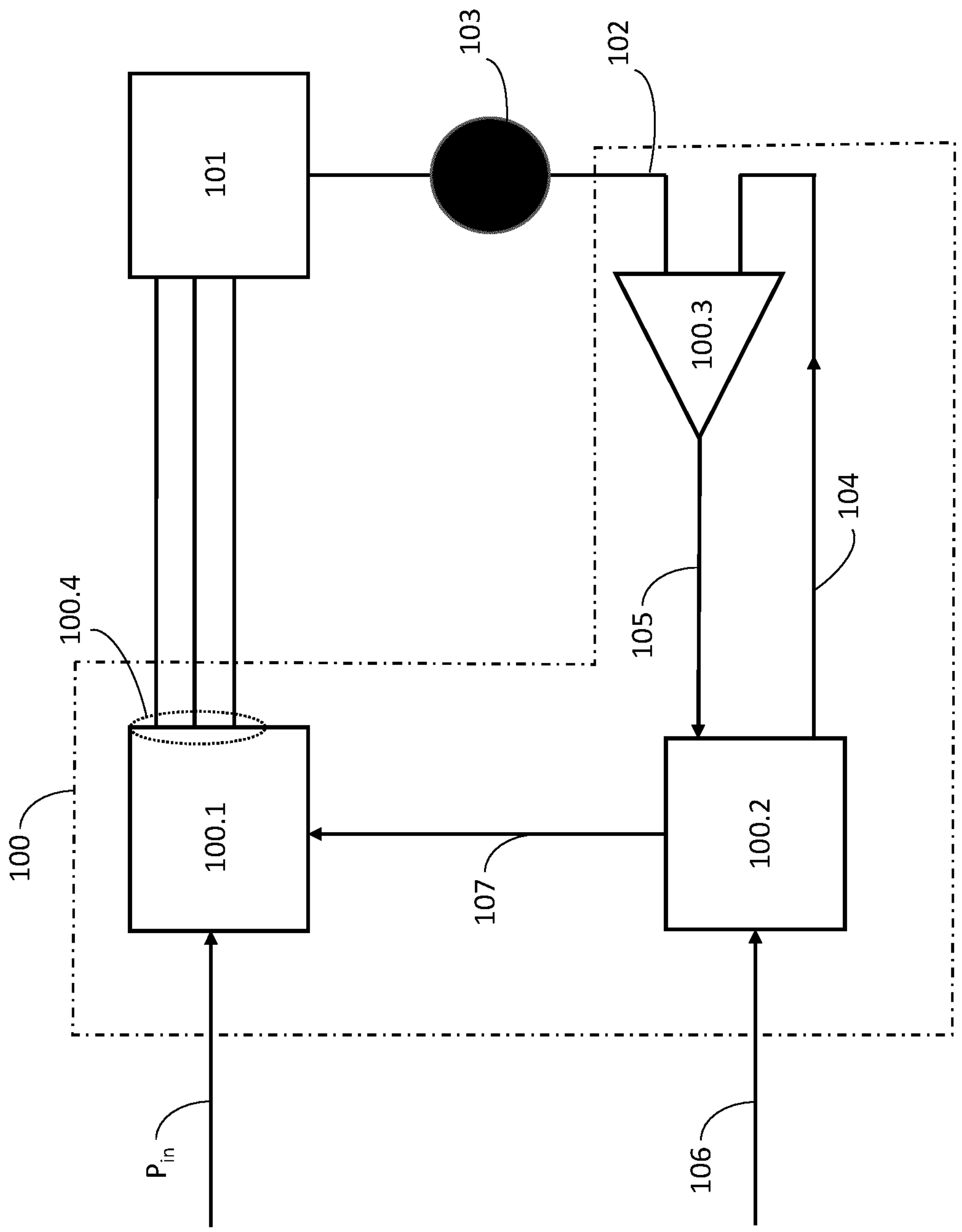
FIG. 1 schematically depicts a first embodiment of the multi-channel LED driver according to the invention.

The comparator 100.3 of the multi-channel LED driver 100 is configured to compare a current signal 102 representing the current measured through a respective LED string by a current measurement element 103 with a reference signal 104 of the corresponding output channel 100.4. The comparator 100.3 generates an output signal 105 to control the respective switch of the corresponding power converter 100.1.

The controller 100.2 of the multi-channel LED driver 100 is arranged to receive an illumination set point 106, representing a desired color for the light to be generated by the LED fixture 101. Based on the illumination set point 106, the controller 100.2 determines current set points for the different output channels 100.4 of the multi-channel LED driver 100. The controller 100.2 is further arranged to determine successive for each of the plurality of power converters 100.1, a duty cycle of the respective switch of the power converter 100.1. First, the controller 100.2 provides the reference signal 104, representing the current set point of the respective output channel 100.4, to the comparator 100.3. The controller 100.2 enables the comparator 100.3 at a beginning of a measurement window for the respective power converter 100.1 of the corresponding output channel, which measurement window is a part of a cycle time, to compare the current signal 102 of the respective output channel with the reference signal 104. The measurement windows of the different switches are considered to be not overlapping in time. As above mentioned, the comparator 100.3 generates an output signal 105 during the respective measurement window. The output signal 105 can be used directly to control the respective switch of the corresponding output channel during the respective measurement window and/or be provided to the controller. In the first case (not shown in FIG. 1), the controller 100.2 uses the output signal 105 only to determine the duty cycle during the measurement window. In the second case (as shown in FIG. 1), the controller 100.2 uses the output signal 105 both to determine the duty cycle and to control the respective switch of the corresponding power converter 100.1 using the output signal 105 during the measurement window. Outside the measurement window the controller 100.2 is further arranged to control the respective switch of the corresponding power converter 100.1 by disabling the comparator 100.3 to control the respective switch and by sending a duty cycle signal 107, representing the duty cycle of the respective switch determined during the measurement window, to the respective switch of the corresponding power converter 100.1 to control an operation of the switch.

Figure 2:
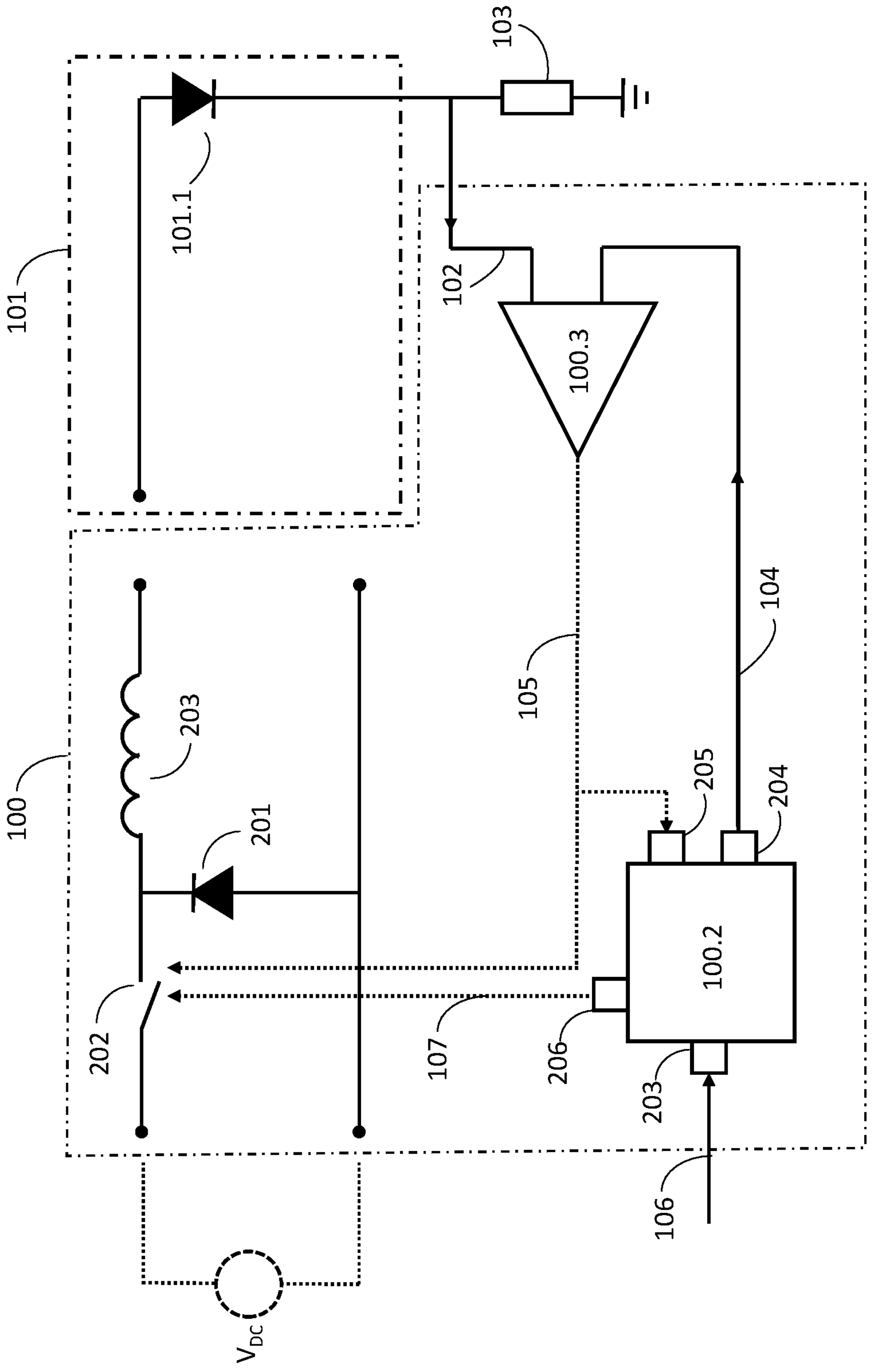
FIG. 2 schematically illustrates different power converters of the multi-channel LED driver according to the invention to drive the different LED strings of the LED fixture, wherein each LED string of the LED fixture is connectable to a respective current measurement element.

In the embodiment as shown in FIG. 2, the multi-channel LED driver comprises a switch mode power converter (SPMC), especially a Buck converter, to convert an input voltage VDC to a current I. In an embodiment, the SMPC may e.g. be powered via a rectified DC supply voltage. In general, such switched mode power converter comprises an unidirectional element such as a diode 201, a switching element 202, e.g. a FET or MOSFET, or power switch, an energy storage element 203, i.e. an inductance. Also other types of converters such as boost, buck-boost, CUCK, SEPIC or other, either synchronous or non-synchronous may advantageously be applied in combination with the present invention.

The switch 202 of the SMPC controls the output current I as supplied by the SMPC to the LED fixture 101. In the embodiment of FIG. 2, only one power converter and an LED fixture 101 comprising only one LED string of the multi-channel LED driver are shown due to illustrative purposes. However, there are no limitations on the amount of power converters and/or LED strings or LED groups.

The controller 100.2 of the multi-channel LED driver receives an illumination set point 106 at a first input terminal 203. Based on the illumination set point 106, the controller sends a reference signal 104 via an output terminal 204, representing the current set point of the respective output channel derived from the illumination set point 106, to the comparator 100.3.

The switching of the switch 202 of the power converter can be controlled by the comparator 100.3 via the output signal 105 during the respective measurement window and by the controller 100.2 via the duty cycle signal 107 outside the respective measurement window. However, as already shown in FIG. 1, the controller 100.2 may also be configured to use the output signal 105 both to determine the duty cycle and to control the respective switch of the corresponding power converter 100.1 using the output signal 105 during the measurement window.

In FIG. 2, the controller further observes the output signal 105 at an second input terminal 205 from the comparator 103, wherein the controller determines the duty cycle of the switch of the power converter during the measurement window. The duty cycle signal 107 is sent at a second output terminal 206 of the controller to the respective switch 202 of the power converter.

Figure 3:
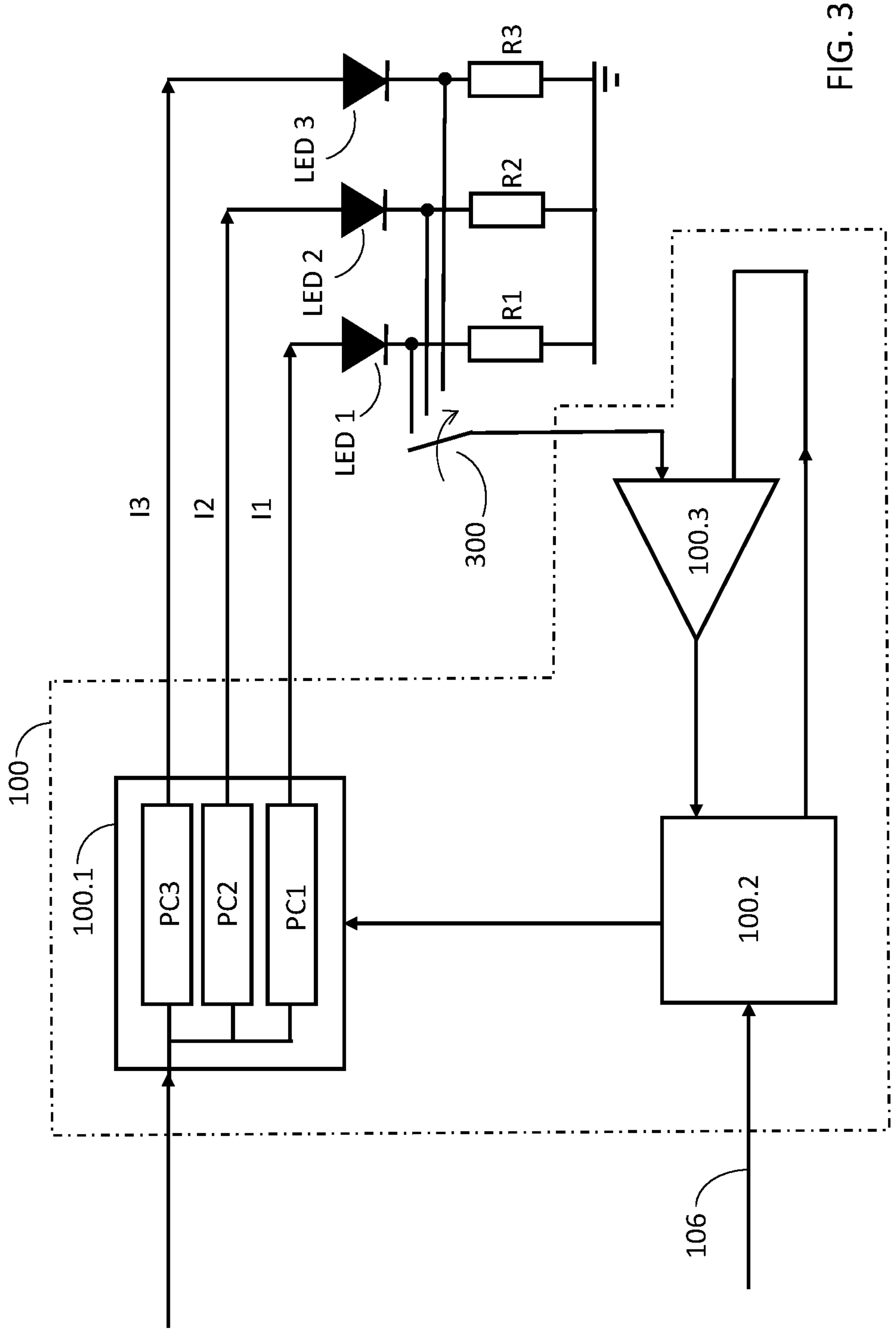
FIG. 3 schematically illustrates different power converters of the multi-channel LED driver according to the invention to drive the different LED strings of the LED fixture, wherein each LED string of the LED fixture is connectable to a common current measurement element.

The embodiment of FIG. 3 shows another possible example of a multi-channel LED driver according to the invention, comprising three different power converters (PC1, PC2, PC3), wherein each power converter comprises a switch, and wherein each power converter converts an input power at an input terminal to a current (I1, I2, I3) at a respective output channel of the multi-channel LED driver. Each output channel is connectable to a corresponding LED string (LED1, LED2, LED3) of the LED fixture.

Each LED string is connectable to a corresponding current measurement element (R1, R2, R3). The current measurement element (R1, R2, R3) may e.g. be a resistor. The current through the resistor with a known resistance value generates a voltage, which is provided at the input of the comparator 100.3.

In an embodiment, as shown in FIG. 3, a comparator switch 300 is arranged at an input of the comparator 100.3, wherein the comparator switch 300 is configured to connect the current measurement element of the respective output channel of the multi-channel LED driver with the input of the comparator at the beginning of the corresponding measurement window.

In FIG. 3 the comparator may switch from a first position (open circuit), wherein no connection is made between a respective output channel and the input at the comparator, to a second position (closed circuit), wherein a connection is made between a respective output channel and the input at the comparator. In FIG. 3, the comparator switch may switch, as indicated by the arrow, to connect a first output channel during a first measurement window. Once the duty cycle of the first output channel is determined by the controller, the comparator may switch to connect a second output channel during a second measurement window. When the duty cycle of the second output channel is determined by the controller, the comparator may switch to connect a third output channel during a third measurement window. The switching may be performed periodically at predetermined time intervals.

Figure 4:
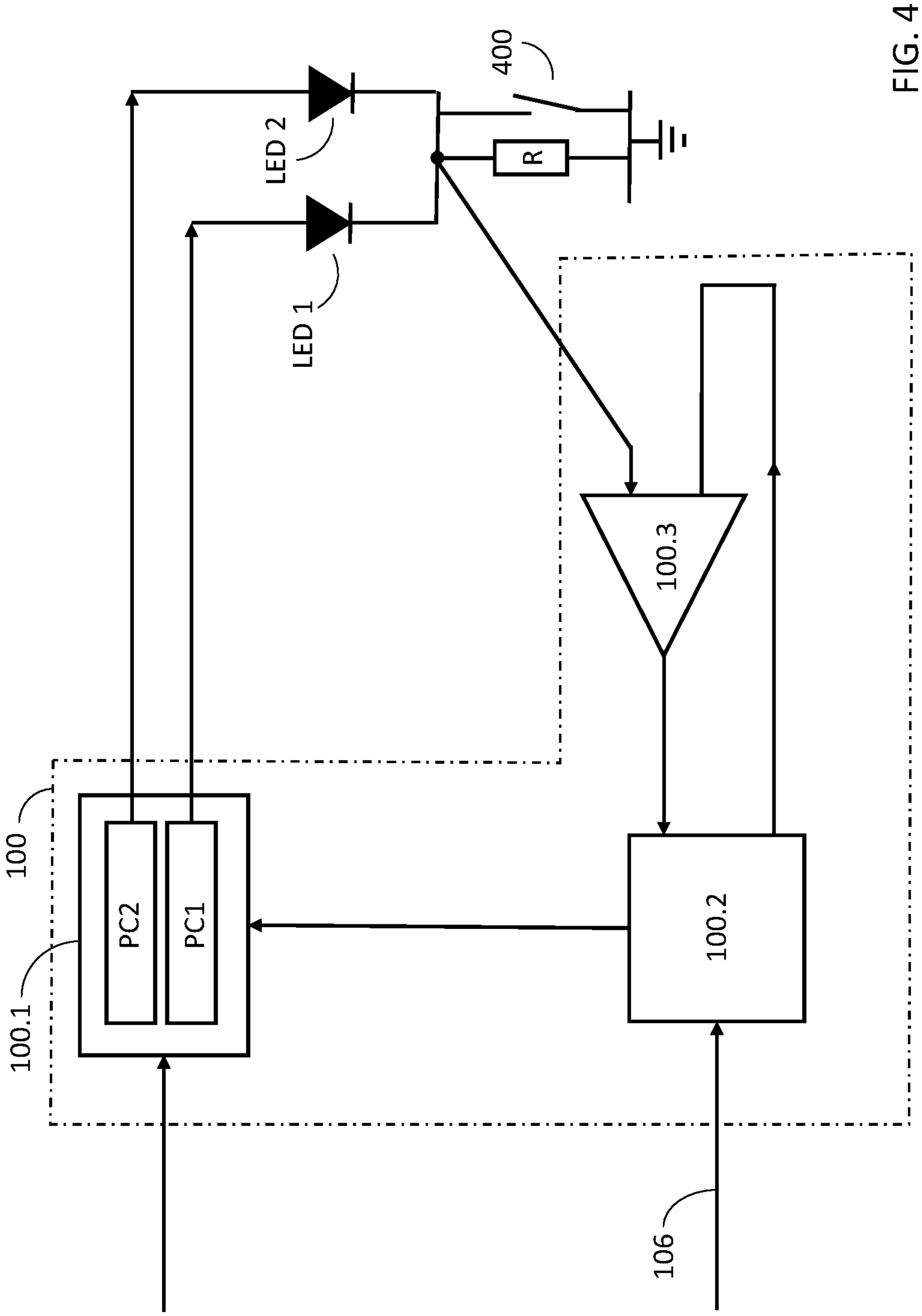
FIG. 4 schematically illustrates a switched mode power supply as the power converter of the multi-channel LED driver according to the invention to drive the LED fixture.

The embodiment of FIG. 4 illustrates a multi-channel LED driver according to the invention, wherein the multi-channel LED driver comprises two power converters (PC1, PC2). Each power converter has an output channel, which output channel is connectable to a respective LED string (LED1, LED2).

The currents through the different output channels may be measured by a common current measurement element (R). The advantage is that the regulation will be enhanced, since a potential deviation or error of the current measurement element will be the same for each output channel. If for each output channel a different current measurement element is used, the potential deviation or error is more difficult to detect.

If only one output channel has a current equal to nonzero during the cycle time, no comparator switch is needed to switch between the different output channels, as is shown in the embodiment of FIG. 4. The potential drop across the current measurement element R is provided at the input of the comparator 100.3.

In FIG. 4, a parallel switch 400 is arranged in parallel to the current measurement element, which current measurement element is shorted by the parallel switch 400 during the period the comparator 100.3 is disabled. The advantage is that outside the measurement windows, the current measurement element is not needed and therefore the power loss originating from the current measurement element is reduced. It can be pointed out that such a parallel switch 400 may also be applied in the embodiment shown in FIG. 3, e.g. arranged in parallel to each or some of the current measurement elements R1, R2, R3.

Figure 5:
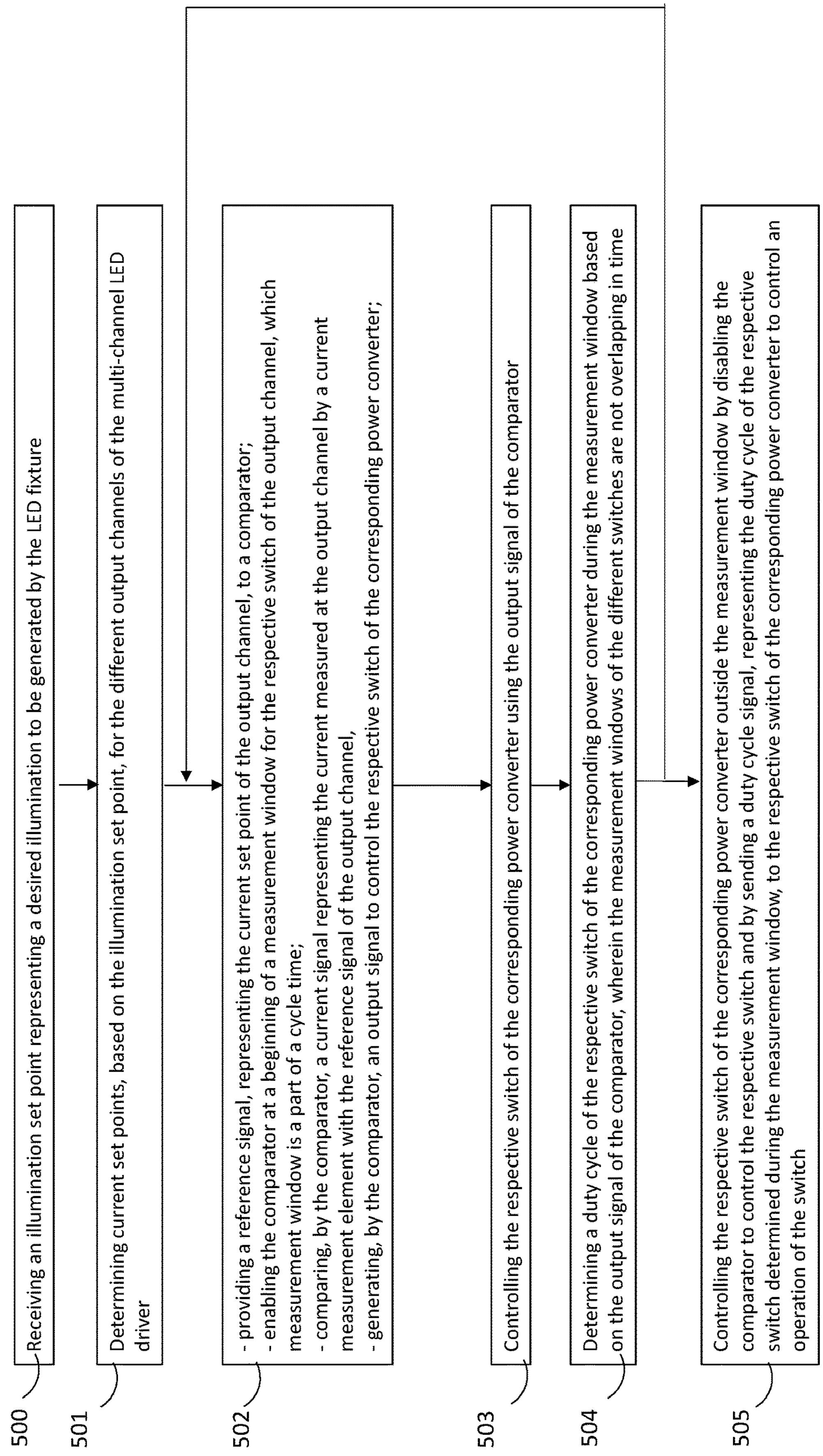
FIG. 5 schematically depicts an embodiment of a flow diagram of the method according to the invention.

FIG. 5 schematically depicts a flow diagram of an embodiment of the method according to the invention for driving a LED fixture comprising a plurality of LED groups or LED strings by a multi-channel LED driver comprising a plurality of output channels and a plurality of power converters, wherein each power converter comprises a switch. Each output channel of the respective power converter is connectable to an LED or LED string of the LED fixture. The method according to the invention comprises a first step 500 of receiving an illumination set point representing a desired illumination for the light to be generated by the LED fixture. The illumination set point may e.g. be a mathematical description of the desired color in a color space. In particular, the illumination set point represents the desired color in the color space. In such case, the illumination set point characterizes a color coordinate in the color space with a corresponding intensity.

Further the method comprises a second step 501, determining current set points, based on the illumination set point, for the different output channels of the multi-channel LED driver. A current set point associated with a particular output channel may e.g. characterize the intensity or current value for the respective LED string of the LED fixture to realize the desired color.

Thereafter, the method comprises a cycle or loop of substeps (502-505) to determine successive, for each of the plurality of output channels, a duty cycle of the respective of the power converter. The cycle of substeps is performed successively for all the different output channels. In the first substep 502, the following steps are performed:

providing a reference signal, representing the current set point of the output channel, to a comparator;

enabling the comparator at a beginning of a measurement window for the respective switch of the output channel, which measurement window is a part of a cycle time;

comparing, by the comparator, a current signal representing the current measured at the output channel by a current measurement element with the reference signal of the output channel, generating, by the comparator, an output signal to control the respective switch of the corresponding power converter;

In the second substep 503, the respective switch of the corresponding power converter is controlled by using the output signal of the comparator. In substep 504, a duty cycle of the respective switch of the corresponding power converter is determined during the measurement window based on the output signal of the comparator. The measurement windows of the different switches are not overlapping in time.

After duty cycle of the respective switch is determined, the switch is controlled in substep 505 outside the measurement window by disabling the comparator to control the respective switch and by sending a duty cycle signal to the respective switch of the corresponding power converter to control an operation of the switch. The duty cycle signal represents the duty cycle of the respective switch determined during the measurement window.

Once the duty cycle of an output channel has been determined and the duty cycle of the switch is controlled by the duty cycle signal, the comparator need no longer determine an output signal for controlling the switch of the power converter associated with said output channel and the comparator may then be used to determine the duty cycle of a next output channel.

Figure 6:
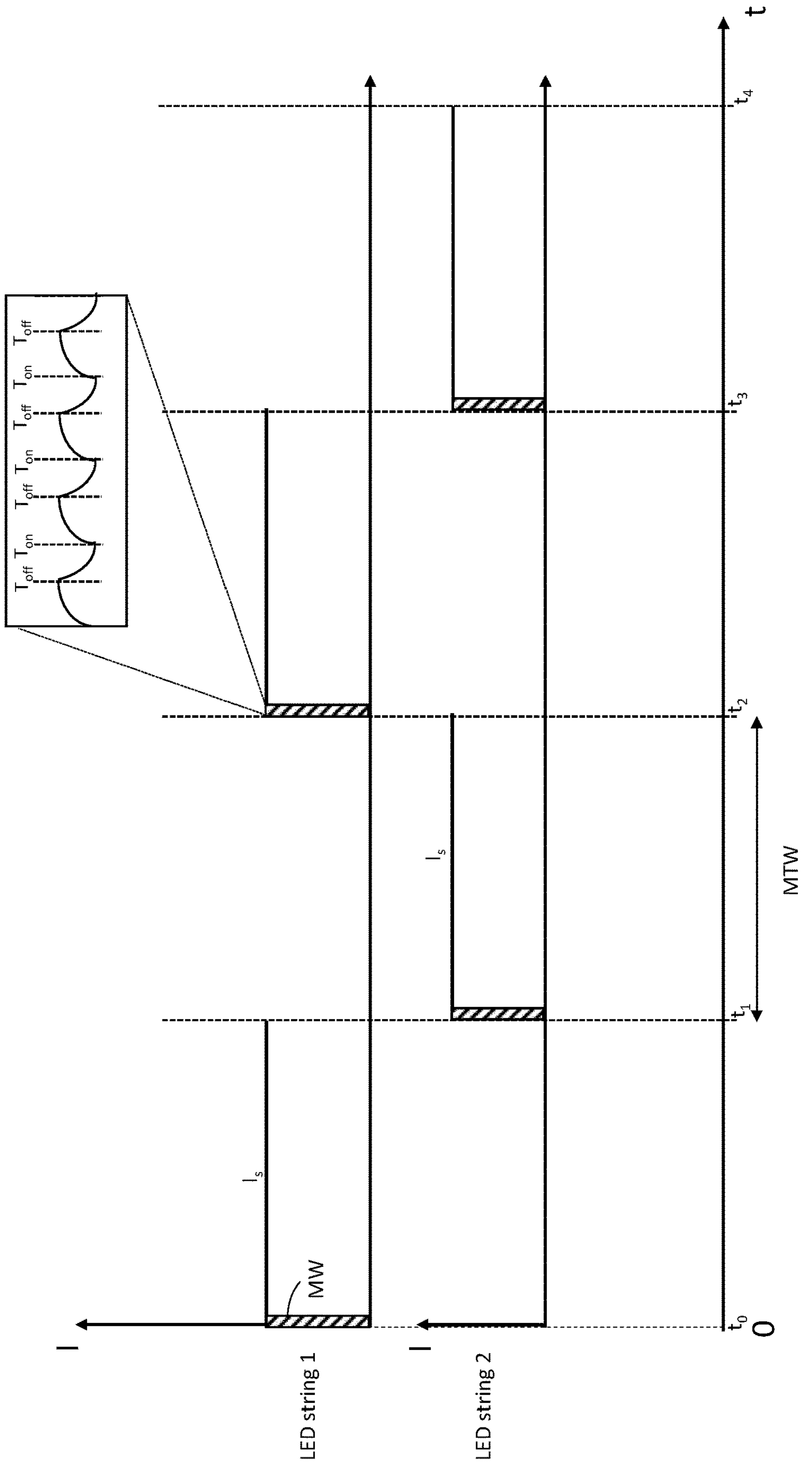
FIGS. 6 and 7 schematically depicts embodiments of a timing diagram of driving the LED fixture by the multi-channel LED driver according to the method according to the invention.

FIG. 6 schematically shows a possible timing diagram of driving a LED fixture, comprising a plurality of LED strings (in this embodiment the LED fixture comprises two different LED strings), by the multi-channel LED driver according to the method according to the invention, wherein the currents provided by the power converters of the multi-channel LED driver to the different LED strings of the LED fixture are plotted in function of time.

Concerning the current through LED string 1 of the LED fixture, at time to a current $I_s$ is provided by a first power converter of the multi-channel LED driver at a first output channel, which is connected to the LED string 1, during a modulation time window (MTVV), i.e. the cycle time. As can be seen in the embodiment of FIG. 6, a fraction of the MTW indicates the measurement window MW (indicated by the shaded areas). The measurement windows (MW) of the different output channels are not overlapping in the modulation window (MTW).

In the embodiment of FIG. 6, in each modulation time window MTW, only one output channel provides a non-zero current value. As such, in accordance with the graph for LED string 1, one can see that during the intervals $t_0$ to $t_1$ and $t_2$ to $t_3$, the respective power converter provides a current, whereas for the LED string 2 a supply current $I_s$ is provided during the time intervals $t_1$ to $t_2$ and $t_3$ to $t_4$. This preferred embodiment requires one common current measurement element to measure the current through a respective output channel. Note that the amplitude of the supplied currents to the different LED strings do not have to be the same. In an embodiment of the present invention, the controller is configured to control the switching operation of a respective switch of the switched mode power converter (SMPC). Due to the switching operation of the SMPC, the output current Is of the SMPC will not be constant but will have a saw-tooth profile, as illustrated in detail of the current. In the detail, instants $T_{on}$ and $T_{off}$ indicate switching instants of the switch. At instants $T_{on}$, the switch is closed causing an increasing current, whereas at instants $T_{off}$, the switch is switched to an open position leading to a decrease of the current.

Figure 7:
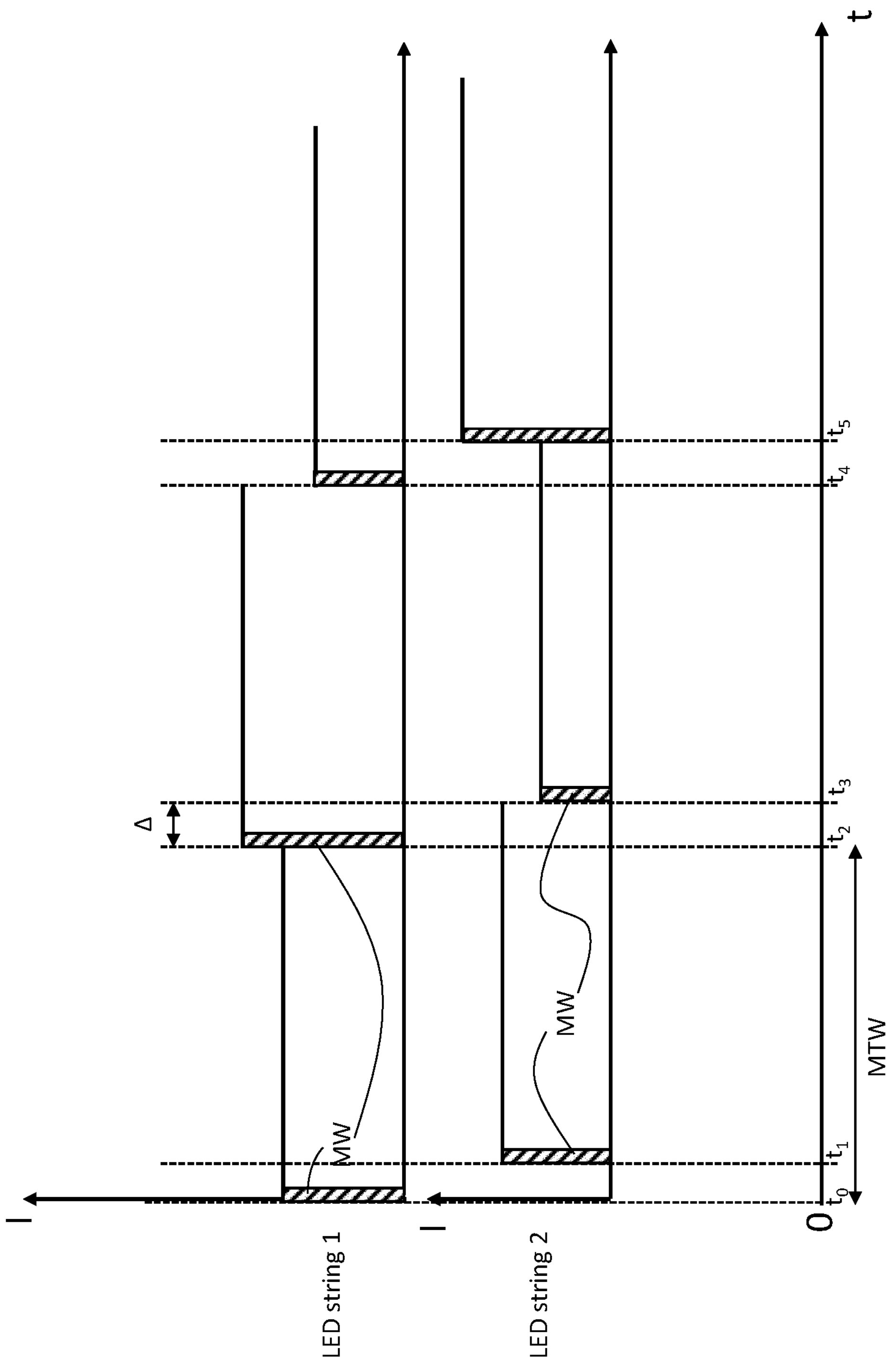

FIG. 7 shows another possible time diagram of driving a LED fixture by the multichannel-LED driver according to the method according to the invention, wherein the currents provided by the power converters of the multi-channel LED driver to the different LED strings of the LED fixture are plotted in function of time. In the embodiment as illustrated in FIG. 7, one can see that starting at t0, t2 and t4, in particular during measurement windows MW starting at these instants, the current through the LED string 1 is determined. Further, starting at instants t1, t3 and t5, in particular during measurement windows MW starting at these instants, the current through the LED string 2 is determined. The measurement windows for the different LED strings are not overlapping in the modulation time window MTW. The measurement windows of the different LED strings are separated by a time period Δ. By means of the time period Δ, one can thus ensure that the determining steps of the duty cycle of the different switches associated with the LED strings of the LED fixture are arranged to occur at different instants in time, so that only one comparator is needed.

Outside the measurement windows, e.g. between t1 to t2, the comparator is disabled, wherein the current measurement element is shorted by a parallel switch, arranged in parallel to the respective current measurement element.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

The invention claimed is:

1. A multi-channel LED driver for driving an LED fixture, comprising:

a plurality of output channels, wherein each output channel is connectable to an LED or LED string of the LED fixture;

a plurality of power converters, each power converter being associated with an output channel of the plurality of output channels, wherein each power converter comprises a switch, and wherein each power converter converts an input power at an input terminal to a current at a respective output channel of the multi-channel LED driver;

a comparator configured to compare a current signal representing the current measured at the output channel by a current measurement element with a reference signal representing a current set point for the output channel, wherein the comparator generates an output signal to control the switch of the power converter associated with the output channel;

a controller arranged to:

receive an illumination set point representing a desired illumination to be generated by the LED fixture;

determine current set points, based on the illumination set point, for the plurality of output channels of the multi-channel LED driver;

wherein the controller is further arranged to determine successive, for each of the plurality of power converters associated with the plurality of output channels, a duty cycle of the respective switch of the power converter by:

providing the reference signal, representing the current set point of the output channel associated with the power converter, to the comparator;

enabling the comparator at a beginning of a measurement window, which measurement window is a part of a cycle time, to compare the current signal of the output channel with the reference signal and generate an output signal to control the switch of the power converter;

controlling the switch of the power converter using the output signal; and determining a duty cycle of the switch of the power converter during the measurement window based on the output signal of the comparator;

wherein the measurement window of the different switches of the plurality of power converters is not overlapping in time;

and wherein the controller is further arranged to:

control the switch of the power converter outside the measurement window by:

disabling the comparator to control the switch and providing a duty cycle signal, representing the duty cycle of the switch as determined during the measurement window, to the switch of the power converter to control an operation of the switch.

2. The multi-channel LED driver according to claim 1, wherein a parallel switch is arranged in parallel to the current measurement element, which current measurement element is shorted by the parallel switch during the period the comparator is disabled.

3. The multi-channel LED driver according to claim 1, wherein a comparator switch is arranged at an input of the comparator, wherein the comparator switch is configured to connect the current measurement element of a respective output channel of the multi-channel LED driver with the input of the comparator at the beginning of the corresponding measurement window.

4. The multi-channel LED driver according to claim 1, wherein the controller is configured to perform the enabling step of the comparator periodically.

5. The multi-channel LED driver according to claim 1, wherein the illumination set-point is generated by a user interface.

6. The multi-channel LED driver according to claim 1, wherein the comparator is configured to provide the output signal directly to the switch of the power converter during the measurement window.

7. The multi-channel LED driver according to claim 1, wherein the current measurement element is a resistor.

8. A method of driving a LED fixture by a multi-channel LED driver comprising a plurality of output channels and a plurality of power converters, each power converter being associated with an output channel of the plurality of output channels, wherein each power converter comprises a switch, and wherein each output channel of the respective power converter is connectable to an LED or LED string of the LED fixture, the method comprising:

receiving an illumination set point representing a desired illumination to be generated by the LED fixture;

determining current set points, based on the illumination set point, for the plurality of output channels of the multi-channel LED driver;

determining successive, for each of the plurality of power converters associated with the plurality of output channels, a duty cycle of the respective switch of the power converter by:

providing a reference signal, representing the current set point of the output channel, to a comparator;

enabling the comparator at a beginning of a measurement window for the respective switch of the output channel, which measurement window is a part of a cycle time;

comparing, by the comparator, a current signal representing the current measured at the output channel by a current measurement element with the reference signal of the output channel, generating, by the comparator, an output signal to control the respective switch of the corresponding power converter;

controlling the respective switch of the power converter using the output signal of the comparator;

determining a duty cycle of the respective switch of the power converter during the measurement window based on the output signal of the comparator, wherein the measurement window of the different switches of the plurality of power converters do not overlap in time; and wherein the method further comprises:

controlling the switch of the power converter outside the measurement window by disabling the comparator to control the switch and providing a duty cycle signal, representing the duty cycle of the switch determined during the measurement window, to the switch of the corresponding power converter to control an operation of the switch.

9. The method according to claim 8, wherein only one output channel has a current equal to nonzero during the cycle time.

10. The method according to claim 9, wherein the current through the different output channels is measured by a common current measurement element.

11. The method according to claim 8, wherein the measurement window is shorter than the cycle time.

12. The method according to claim 8, wherein the current measurement element is shorted by a parallel switch, arranged in parallel to the current measurement element, during the period the comparator is disabled.

13. The method according to claim 8, wherein the cycling time is set at 3.3 ms.

14. The method according to claim 8, wherein the enabling step of the comparator is performed periodically.

* * * * *